United States Patent
Takahashi

(10) Patent No.: US 9,635,281 B2
(45) Date of Patent: Apr. 25, 2017

(54) IMAGING APPARATUS METHOD FOR CONTROLLING IMAGING APPARATUS AND STORAGE MEDIUM

(71) Applicant: CANON KABUSHIKI KAISHA, Tokyo (JP)

(72) Inventor: Ryo Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 14/574,043

(22) Filed: Dec. 17, 2014

(65) Prior Publication Data

US 2015/0181134 A1    Jun. 25, 2015

(30) Foreign Application Priority Data

Dec. 25, 2013 (JP) .................................. 2013-267154

(51) Int. Cl.
H04N 5/262 (2006.01)
H04N 5/225 (2006.01)
H04N 5/232 (2006.01)

(52) U.S. Cl.
CPC ......... *H04N 5/2621* (2013.01); *H04N 5/2258* (2013.01); *H04N 5/23293* (2013.01)

(58) Field of Classification Search
USPC ........................................................ 348/239
See application file for complete search history.

(56) References Cited

U.S. PATENT DOCUMENTS

2005/0036044 A1\* 2/2005 Funakura ........... G06K 9/00228
                                                     348/239

FOREIGN PATENT DOCUMENTS

JP    2011217121 A    10/2011

\* cited by examiner

*Primary Examiner* — Stephen Coleman
(74) *Attorney, Agent, or Firm* — Canon U.S.A., Inc. IP Division

(57) ABSTRACT

An imaging apparatus includes a first imaging unit, a second imaging unit, a mode setting unit that sets a still image capturing mode, and a control unit that performs control to display on a display unit an image obtained by superimposing an image captured by the second imaging unit on an image captured by the first imaging unit, wherein the control unit performs control in such a manner that when a first still image capturing mode has been set by the mode setting unit, the image captured by the second imaging unit is displayed at a position further away from an end portion of the image captured by the first imaging unit than a position of when a second still image capturing mode has been set by the mode setting unit.

19 Claims, 12 Drawing Sheets

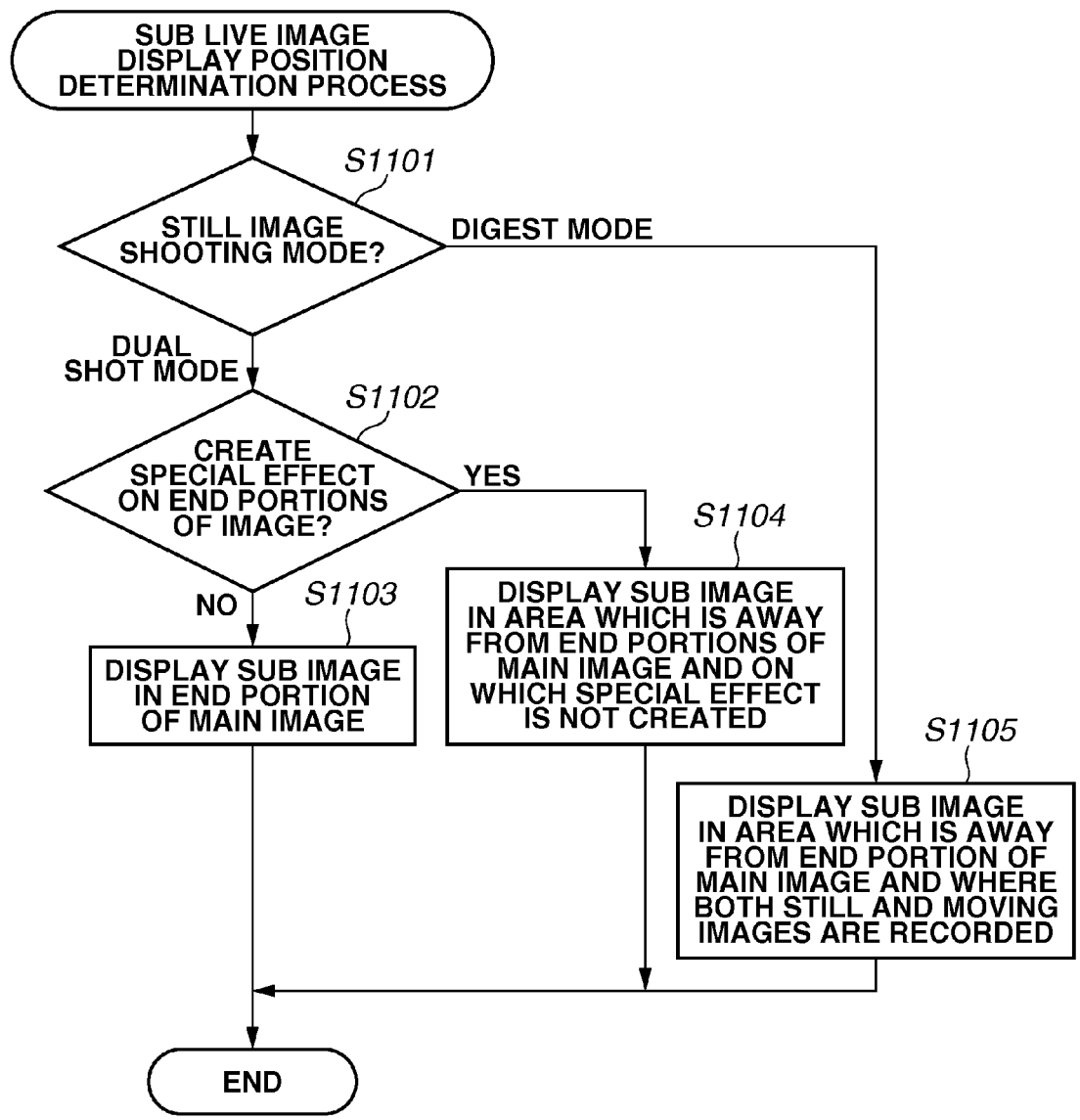

IMAGING APPARATUS METHOD FOR CONTROLLING IMAGING APPARATUS AND STORAGE MEDIUM

BACKGROUND

Field

Aspects of the present invention generally relate to a method for operating an imaging apparatus including a plurality of image capture units, and a method for controlling the imaging apparatus.

Description of the Related Art

Japanese Patent Application Laid-Open No. 2011-217121 discusses an imaging apparatus including two image capture units, as an imaging apparatus capable of capturing objects located in directions opposite to each other. In such an imaging apparatus, the two image capture units can simultaneously capture images according to capturing instructions.

SUMMARY

Aspects of the present invention have been made in consideration of the aforementioned, and realize improvements in usability for a user by, when displaying on an image captured by one image capture unit an image captured by another image capture unit, performing image display at a suitable position according to a shooting mode.

According to an aspect of the present invention, an imaging apparatus includes a first imaging unit, a second imaging unit, a control unit configured to perform control to display on a display unit an image obtained by combining an image captured by the second imaging unit with an image captured by the first imaging unit in such a manner that the image captured by the second imaging unit is superimposed on the image captured by the first imaging unit, and a mode setting unit configured to set a shooting mode, wherein the control unit controls a composition position of the image captured by the second imaging unit to the image captured by the first imaging unit, according to the shooting mode set by the mode setting unit.

Further features of the present disclosure will become apparent from the following description of exemplary embodiments with reference to the attached drawings.

BRIEF DESCRIPTION OF THE DRAWINGS

FIG. 11 is a flow chart illustrating a sub live image display position determination process.

DESCRIPTION OF THE EMBODIMENTS

Various exemplary embodiments, features, and aspects will be described in detail below with reference to the drawings.

Figure 1:
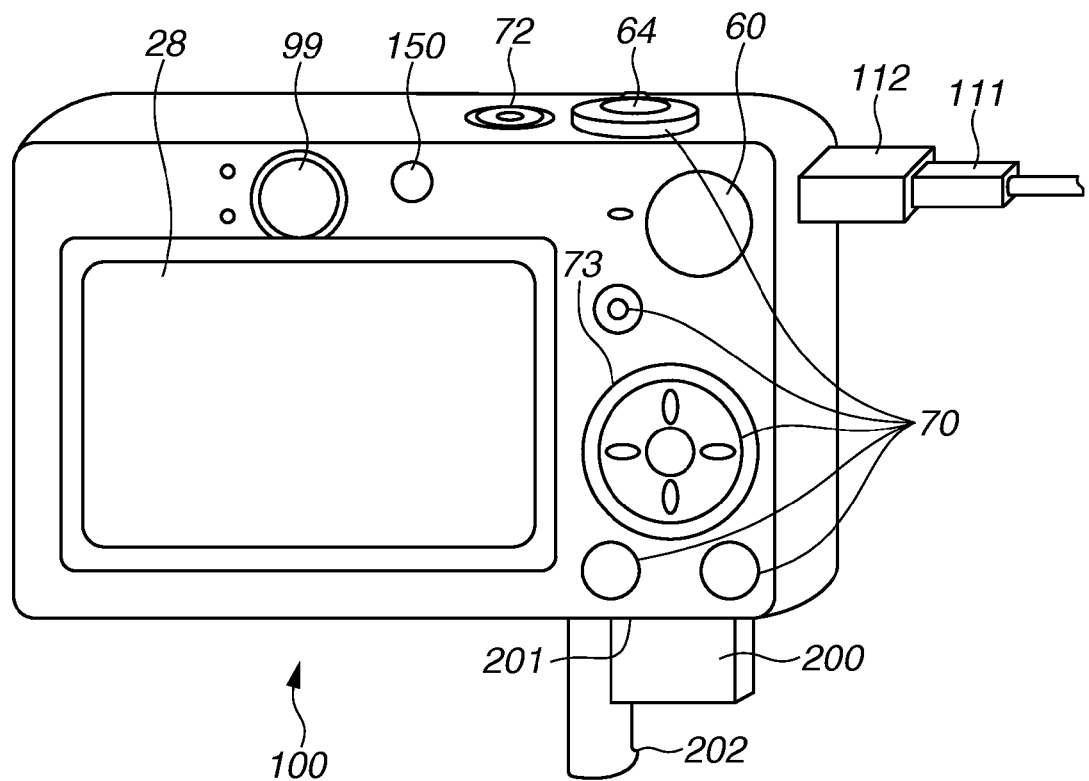
FIG. 1 is a diagram illustrating an example of an external appearance of a digital camera.

FIG. 1 is a diagram illustrating an external view of a digital camera as an example of an imaging apparatus. A display unit 28 is a display unit for displaying an image and various types of information. A shutter button 64 is an operation unit for issuing a capturing instruction. A mode switching dial 60 is an operation unit for switching various mode settings. A connector 112 is a connector between a connection cable and a digital camera 100. An operation unit 70 is an operation unit including operation members, such as various switches and buttons for receiving various operations from a user. A controller wheel 73 is an operation member included in the operation unit 70 and capable of being rotationally operated. A power supply switch 72 is used to switch on and off a power supply. A recording medium 200 is a recording medium, such as a memory card or a hard disk. A recording medium slot 201 is a slot for storing the recording medium 200. The recording medium 200 stored in the recording medium slot 201 can communicate with the digital camera 100. A cover 202 is a cover for the recording medium slot 201. As a sub camera 150, a camera module capable of capturing a side of a photographer who is capturing an object is provided. FIG. 1 illustrates an external view of the back side of the digital camera 100, on which the display unit 28 is provided. On the surface of the front side of the digital camera 100, an outer camera 104 is provided, which is a camera module for capturing an object side. The optical axes (capturing directions) of the outer camera 104 and the sub camera 150 are approximately parallel to each other, and the optical axis (capturing direction) of the outer camera 104 is set in a direction opposite to that of the optical axis (capturing direction) of the sub camera 150.

Figure 2:
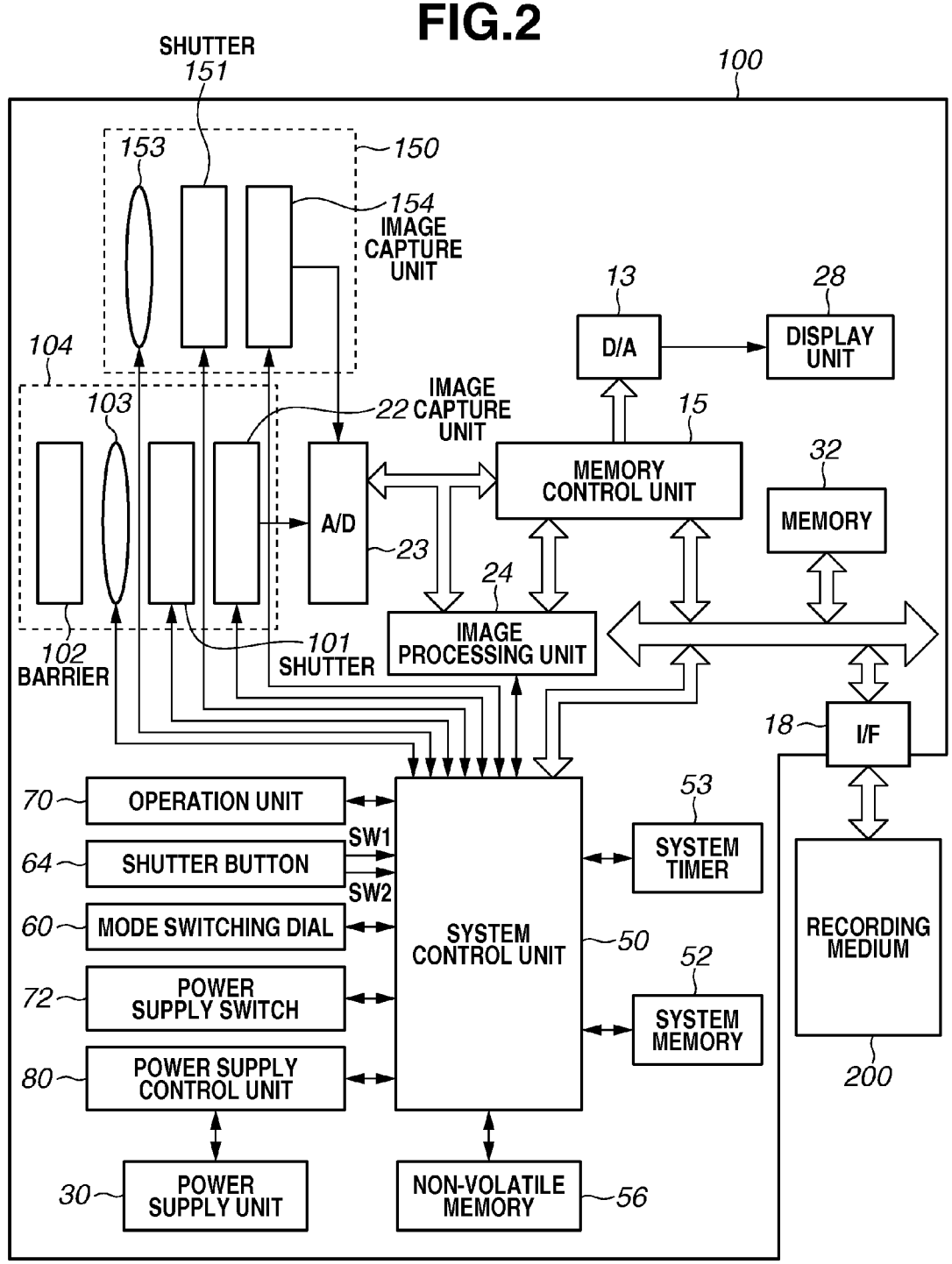
FIG. 2 is a diagram illustrating an example of the hardware configuration of the digital camera.

FIG. 2 is a block diagram illustrating an exemplary configuration of the digital camera 100 according to a first exemplary embodiment.

In FIG. 2, an imaging lens 103 is a lens group including a zoom lens and a focus lens. A shutter 101 is a shutter having a diaphragm function. An image capture unit is an image sensor including a charge-coupled device (CCD) or a complementary metal-oxide-semiconductor (CMOS) device, which converts an optical image into an electric signal. An analog-to-digital (A/D) converter 23 converts an analog signal into a digital signal. A barrier 102 covers an imaging system of the digital camera 100 including the imaging lens 103, thereby preventing stains on and breakage of the imaging system including the imaging lens 103, the shutter 101, and the image capture unit 22. The outer camera 104 includes the image capture unit 22, the shutter 101, the imaging lens 103, and the barrier 102.

Similarly, an imaging lens 153 is a lens group including a zoom lens and a focus lens on the sub camera 150 side. A shutter 151 is a shutter having a diaphragm function on the sub camera 150 side. An image capture unit 154 is an image sensor including a CCD or a CMOS device, which converts an optical image into an electric signal on the sub camera 150 side (photographer side). The A/D converter 23 converts an analog signal into a digital signal. The A/D converter 23 is used not only to convert a signal output from the image capture unit 22, but also to convert an analog signal output from the image capture unit 154 into a digital signal.

An image processing unit 24 performs a resizing process, such as predetermined pixel interpolation and reduction, and a color conversion process on data from the A/D converter 23 or data from a memory control unit 15. Further, the image processing unit 24 performs a predetermined calculation process using captured image data. Then, a system control unit 50 performs exposure control and distance measurement control based on the obtained calculation result. Consequently, an autofocus (AF) process, an automatic exposure (AE) process, and a pre-flash (EF) process are performed by a through-the-lens (TTL) method. The image processing unit 24 also performs a predetermined calculation process using captured image data, and performs an automatic white balance (AWB) process by the TTL method based on the obtained calculation result.

Output data from the A/D converter 23 is directly written to a memory 32 via the image processing unit 24 and the memory control unit 15 or via the memory control unit 15. The memory 32 stores image data obtained by the image capture unit 22 and converted into digital data by the A/D converter 23 and image data to be displayed on the display unit 28. The memory 32 includes a sufficient storage capacity for storing a predetermined number of still images and a moving image and a sound of a predetermined length of time.

Further, the memory 32 doubles as a memory for image display (video memory). A digital-to-analog (D/A) converter 13 converts data for image display stored in the memory 32 into an analog signal and supplies the analog signal to the display unit 28. Consequently, image data for display written in the memory 32 is displayed on the display unit 28 via the D/A converter 13. The display unit 28 performs display on a display device, such as a liquid crystal display (LCD), according to an analog signal from the D/A converter 13. Analog signals are once converted into digital signals by the A/D converter 23, and the digital signals are accumulated in the memory 32 and converted into analog signals by the D/A converter 13. Then, the analog signals are sequentially transferred to and displayed on the display unit 28. This enables the display unit 28 to function as an electronic viewfinder and perform live image display. According to the present exemplary embodiment, a description is given on the assumption that the aspect ratio of the display unit 28 is 4:3.

A non-volatile memory 56 is an electrically erasable and recordable memory and is, for example, an Electrically Erasable Programmable Read-Only Memory (EEPROM). The non-volatile memory 56 stores a constant and a program for the operation of the system control unit 50. The term "program" refers to a program for performing processes of various flow charts described later in the present exemplary embodiment.

The system control unit 50 controls the entirety of the digital camera 100. The system control unit 50 executes the above program recorded in the non-volatile memory 56, thereby achieving the processes described later in the present exemplary embodiment. A system memory 52 is a random-access memory (RAM). A constant and a variable for the operation of the system control unit 50 and the program read from the non-volatile memory 56 are loaded into the system memory 52. Further, the system control unit 50 also controls the memory 32, the D/A converter 13, and the display unit 28, thereby performing display control.

A system timer 53 is a time measurement unit for measuring a time to be used for various types of control and a time of a built-in clock.

The mode switching dial 60 and the operation unit are used as operation units for inputting various operation instructions to the system control unit 50.

The mode switching dial 60 is used to switch the operation mode of the system control unit 50 to any of a still image capturing mode, a moving image capturing mode, and a reproduction mode. The still image capturing mode includes an automatic shooting mode, an automatic scene determination mode, a manual mode, a scene mode, a program AE mode, a custom mode, and a multi-camera simultaneous shooting mode, where both the outer camera 104 and the sub camera 150 can capture images. The user can switch to any of the modes included in the still image capturing mode using the mode switching dial 60, thereby changing the mode setting. Alternatively, the user may once switch to the still image capturing mode using the mode switching dial 60 and then switch to any of the modes included in the still image capturing mode using another operation member. The use of the mode switching switch 60 also enables switching to a digest mode or a dual shot mode, which are included in the multi-camera simultaneous shooting mode, where both the outer camera 104 and the sub camera 150 can capture images. Similarly, the moving image capturing mode may also include a plurality of modes. A first shutter switch is turned on in an intermediate state of a operation of the shutter button 64 provided in the digital camera 100, by a so-called half press (capturing preparation instruction), and a first shutter switch signal SW1 is generated. By the first shutter switch signal SW1, the operations of an autofocus (AF) process, an automatic exposure (AE) process, an automatic white balance (AWB) process, and a pre-flash (EF) process (capturing preparation process) are started on the outer camera 104 side. If the position of the mode switching switch 60 corresponds to the multi-camera simultaneous shooting mode, and when the first shutter switch is turned on and the first shutter switch signal SW1 is generated, the operations of an AF process and an AE process (capturing preparation process) are started also on the sub camera 150 side.

A second shutter switch is turned on by the completion of the operation of the shutter button 64, by a so-called full press (capturing instruction), and a second shutter switch signal SW2 is generated. By the second shutter switch signal SW2, the system control unit 50 starts a series of operations of a capturing process from the reading of a signal from the image capture unit 22 to the writing of image data to the recording medium 200. In the above-described process, if the position of the mode switching switch 60 corresponds to the multi-camera simultaneous shooting mode, a series of operations of a capturing process from the reading of a signal from the image capture unit 154 to the writing of image data to the recording medium 200 is performed simultaneously with the series of operations of the capturing process from the reading of a signal from the image capture unit 22 to the writing of image data to the recording medium 200.

The operation members of the operation unit 70 are appropriately assigned functions for each scene by the operation of selecting various function icons displayed on the display unit 28 and act as various function buttons. The function buttons include, for example, an end button, a return button, an image forward button, a jump button, a narrowing button, and a change-attributes button. For example, if a menu button is pressed, a menu screen where various settings can be made is displayed on the display unit 28. The user can intuitively make various settings using the menu screen displayed on the display unit 28, a directional button for four directions, namely up, down, left, and right directions, and a SET button.

The controller wheel 73 is an operation member included in the operation unit 70 and capable of being rotationally operated. The controller wheel 73 is used together with the direction button to indicate a selection item. If the controller wheel 73 is rotationally operated, an electrical pulse signal is generated according to the amount of operation. Then, the system control unit 50 controls the components of the digital camera 100 based on the pulse signal. The pulse signal enables determination of an angle of the rotational operation of the controller wheel 73 and the number of rotations of the controller wheel 73. The controller wheel 73 may be any operation member so long as the rotational operation of the operation member can be detected. For example, the controller wheel 73 may be a dial operation member, and the controller wheel 73 itself rotates to generate a pulse signal according to the rotational operation of the controller wheel 73 performed by the user. Alternatively, the controller wheel 73 may be an operation member including a touch sensor, and the controller wheel 73 itself does not rotate, but detects the rotational action of the finger of the user on the controller wheel 73 (so-called touch wheel).

A power supply control unit 80 includes a battery detection circuit, a direct-current-to-direct-current (DC/DC) converter, and a switch circuit for switching blocks to which a current is applied. The power supply control unit 80 detects the presence or absence of attachment of a battery, the type of the battery, and the remaining life of the battery. Further, the power supply control unit 80 controls the DC/DC converter based on these detection results and an instruction from the system control unit 50 and supplies a required voltage to the components including the recording medium 200 for a required period of time.

A power supply unit 30 includes a primary battery, such as an alkaline battery or a lithium battery, a secondary battery, such as a nickel-cadmium (NiCd) battery, a nickel-metal hydrate (NiMH) battery, or a lithium-ion (Li) battery, and an alternating current (AC) adapter. A recording medium interface (I/F) 18 is an interface for the recording medium 200, such as a memory card or a hard disk. The recording medium 200 is a recording medium, such as a memory card, for recording a captured image and includes a semiconductor memory or a magnetic disk.

Figure 3:
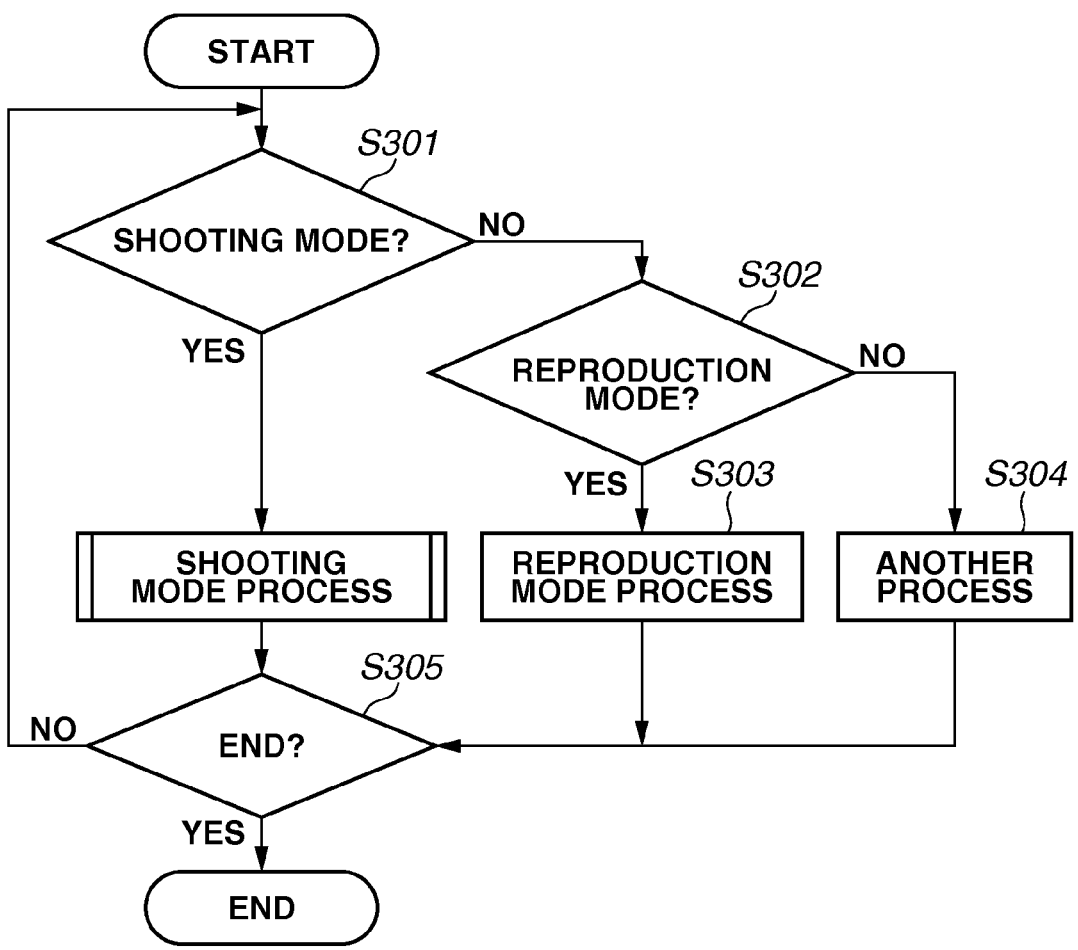
FIG. 3 is a basic flow chart from start to end of the digital camera.

FIG. 3 is a flow chart illustrating a basic flow from start to end of the digital camera 100.

After the digital camera 100 is started, the processing proceeds to step S301. In step S301, based on the position of the mode switching dial 60, determination of whether a shooting mode is set is performed. If it is determined that the shooting mode is set (YES in step S301), a shooting mode process is performed. If it is determined that the shooting mode is not set (NO in step S301), the processing proceeds to step S302. The details of the shooting mode process will be described later. In step S302, based on the position of the mode switching switch 60, determination of whether the reproduction mode is set is performed. If it is determined that the reproduction mode is set (YES in step S302), the processing proceeds to step S303. If it is determined that the reproduction mode is not set (NO in step S302), the processing proceeds to step S304. In step S303, a reproduction mode process is performed. The reproduction mode process includes processes for image viewing, enlargement display, erasing an image, and the like. In step S304, other processes are performed. Other processes include a process in a clock display mode which is for merely displaying the current time. When each mode process ends, the processing proceeds to step S305. In step S305, determination of whether the camera operation is to be shut down is performed. If it is determined that the camera operation is to be shut down (YES in step S305), the camera operation ends. If it is determined that the camera operation is not to be shut down (NO in step S305), the processing returns to step S301.

<Description of Digest Mode and Dual Shot Mode>

The digital camera 100 has the digest mode and the dual shot mode as the still image capturing mode where both the outer camera 104 and the sub camera 150 can capture images.

Figure 12A:
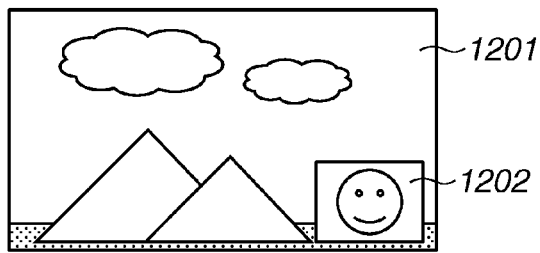
FIGS. 12A, 12B, 12C, and 12D are diagrams illustrating a moving image or a still image to be recorded in a digest mode and a dual shot mode of the digital camera.
Figure 12B:
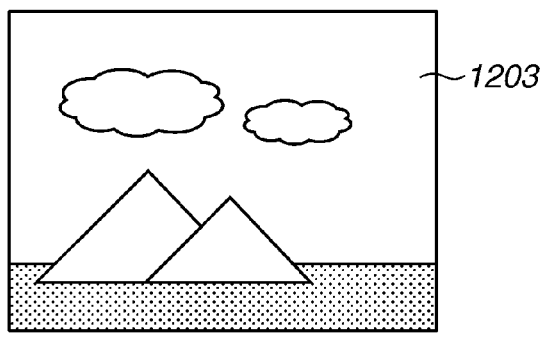
Figure 12C:
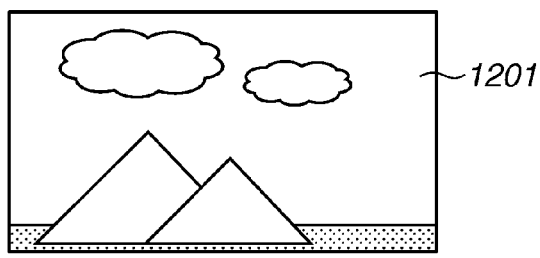

The digest mode is a mode for, when the outer camera 104 captures a still image, automatically recording in a background a moving image captured when the still image is captured. In the digest mode, in response to a full press of the shutter button 64, the outer camera 104 captures a still image, the still image is recorded in the recording medium 200, and a moving image captured by the outer camera 104 before the still image is captured is also recorded. Further, the capturing setting of the sub camera 150 is turned on, thereby enabling the recording of an image obtained by combining an image captured by the sub camera 150 with an image captured by the outer camera 104 so that the image captured by the sub camera 150 is superimposed on the image captured by the outer camera 104. If the capturing setting of the sub camera 150 is set to on, the moving image to be recorded in the digest mode is, as illustrated in FIG. 12A, recorded by combining an image 1202, which has been captured by the sub camera 150, with an image 1201, which has been captured by the outer camera 104, in such a manner that the image 1202 is placed at the lower right of the image 1201. Actually, the sub camera image 1202 is not placed in contact with the ends of the outer camera image 1201, but is placed at a position a predetermined number of pixels (10 pixels according to the present exemplary embodiment) away from the ends of the outer camera image 1201. The still image to be recorded in the digest mode is, as illustrated in FIG. 12B, recorded as an image 1203, which has been captured by the outer camera 104, but is not combined with the image captured by the sub camera 150. In a case where the capturing setting of the sub camera 150 is set to off, as illustrated in FIG. 12C, only the image 1201, which has been captured by the outer camera 104, is recorded as the moving image. The still image to be recorded is, as illustrated in FIG. 12B, recorded as the image 1203, which has been captured by the outer camera 104, regardless of the capturing setting of the sub camera 150. Further, the recording size of the moving image to be recorded in the digest mode is fixed to 1280×720 pixels and an aspect ratio of 16:9. In contrast, the still image has 4000×3000 pixels and an aspect ratio of 4:3. The moving image is recorded with an aspect ratio of 16:9 because the moving image may be viewed by displaying the moving image on a television or a display, which often has an aspect ratio of 16:9. Further, the recording size of the moving image is fixed because the moving image captured in the digest mode is recorded as a single moving image file by connecting moving images obtained by capturing a plurality of still images. In contrast, the still image is often used to be printed as a capture and therefore is recorded with an aspect ratio of 4:3 according to the size of a capture. According to the present exemplary embodiment, the recording size of the still image is also fixed. Alternatively, the recording size of the still image may be configured to be changed by an operation performed by the user.

Figure 12D:
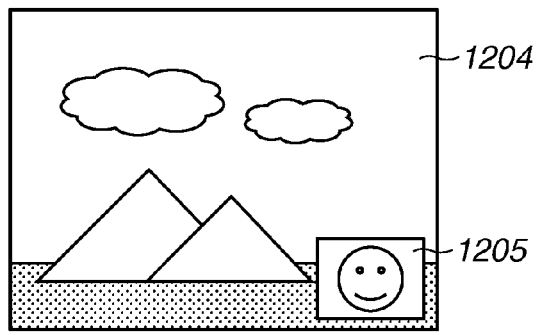

In the dual shot mode, the capturing setting of the sub camera 150 is fixed to on and cannot be changed by the user. In this mode, the sub camera 150 always captures an image. In the dual shot mode, in response to a full press of the shutter button 64, the outer camera 104 and the sub camera 150 capture images. Then, an image is obtained by, as illustrated in FIG. 12D, combining an image 1205, which has been captured by the sub camera 150, with an image 1204, which has been captured by the outer camera 104, in such a manner that the image 1205 is placed at the lower right of the image 1204. Then, the obtained image is recorded as a still image in the recording medium 200. Actually, the sub camera image 1205 is not placed in contact with the ends of the outer camera image 1204, but is placed at a position a predetermined number of pixels (10 pixels, according to the present exemplary embodiment) away from the ends of the outer camera image 1204. The recording size of the still image to be recorded in the dual shot mode is fixed to 2048×1536 pixels (an aspect ratio of 4:3), which cannot be changed by the user. The recording size is fixed because the dual shot mode is a mode of making it easy for the user to capture a still image using the main camera 104 and the sub camera 150.

Next, with reference to flow charts illustrated in FIGS. 5, 6, 7, 8, and 9, the processing performed by the digital camera 100 is described. These flow charts are achieved by the system control unit 50 performing a calculation process and controlling the components of the digital camera 100 based on the program read from the non-volatile memory 56.

Figure 5:
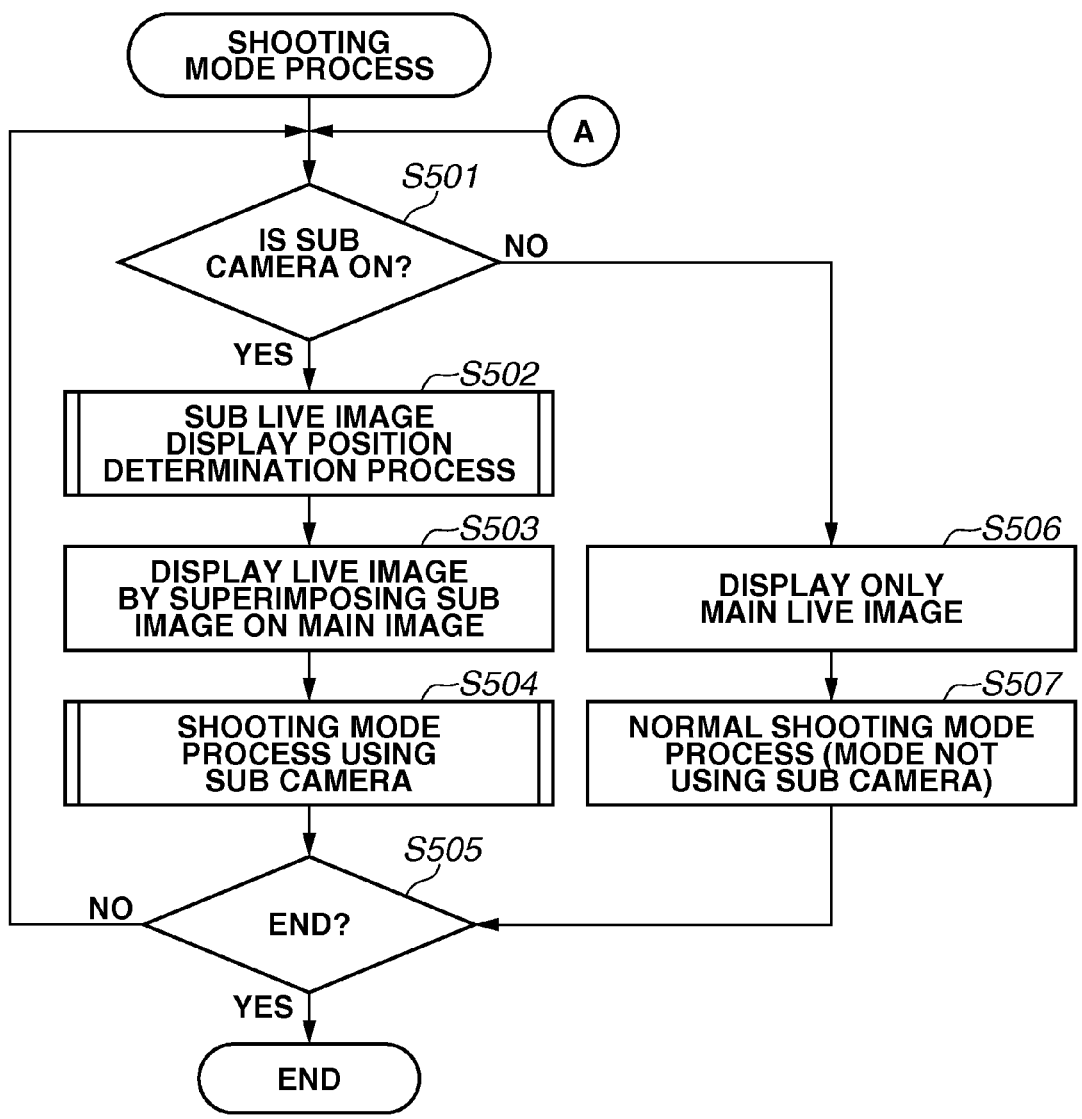
FIG. 5 is a flow chart illustrating a process in a digital camera shooting mode.

FIG. 5 is a flow chart illustrating a flow of basic process in a shooting mode.

In step S501, determination of whether the capturing setting of the sub camera 150 is on, i.e., whether to cause the image capture unit 154 to operate is performed. According to the present exemplary embodiment, if the dual shot mode is set, or if the capturing setting (or display setting) of the sub camera 150 is set to on in the digest mode, it is determined that the capturing setting of the sub camera 150 is on. If the capturing setting of the sub camera 150 is on (YES in step S501), the image capture unit 154 is caused to operate, and the processing proceeds to step S502. In step S502, a sub live image display position determination process is performed for determining the position where an image captured by the sub camera 150 (the image capture unit 154) is to be displayed. The sub live image display position determination process in step S502 will be described later with reference to the flow chart illustrated in FIG. 9. After the sub live image display position determination process, the processing proceeds to step S503. In step S503, an image obtained by superimposing a sub live image, i.e., a live image captured by the image capture unit 154, on a main live image, i.e., a live image captured by the image capture unit 22 is displayed. To display an image in a superimposed manner, the display unit 28 is caused to display an image obtained by combining the sub live image having a smaller size than that of the main live image with the main live image in a superimposed manner at the position, in the main live image, determined by the sub live image display position determination process. The relationship of the position and the size of the sub live image with the main live image of when the sub live image is displayed in a superimposed manner are set to be equivalent to the relationship of the position and the size of the sub image with the main image of when the sub image is recorded in a combined manner. Then, the processing proceeds to step S504, and the shooting mode process using the sub camera 150 is performed. The shooting mode process using the sub camera 150 in step S504 will be described later with reference to the flow chart illustrated in FIG. 6. Then, the processing proceeds to step S505. If, in step S501, the sub camera 150 is not on (NO in step S501), the processing proceeds to step S506. In step S506, only a main live image, i.e., a live image captured by the image capture unit 22 is displayed on the display unit 28. Then, the processing proceeds to step S507. In step S507, a normal shooting mode process not using the sub camera 150 is performed. The normal shooting mode is a mode including displaying the main live image on the display unit 28, according to the pressing of the shutter button 64, performing a development process and a compression process on an image captured by the main camera 104, and recording the resulting image in the recording medium 200. Then, the processing proceeds to step S505.

In step S505, determination of whether the shooting mode is to be ended is performed. If the shooting mode is to be ended (YES in step S505), the shooting mode is ended. If the shooting mode is not to be ended (NO in step S505), the processing returns to step S501. In step S501, the mode remains in the shooting mode.

Figure 6:
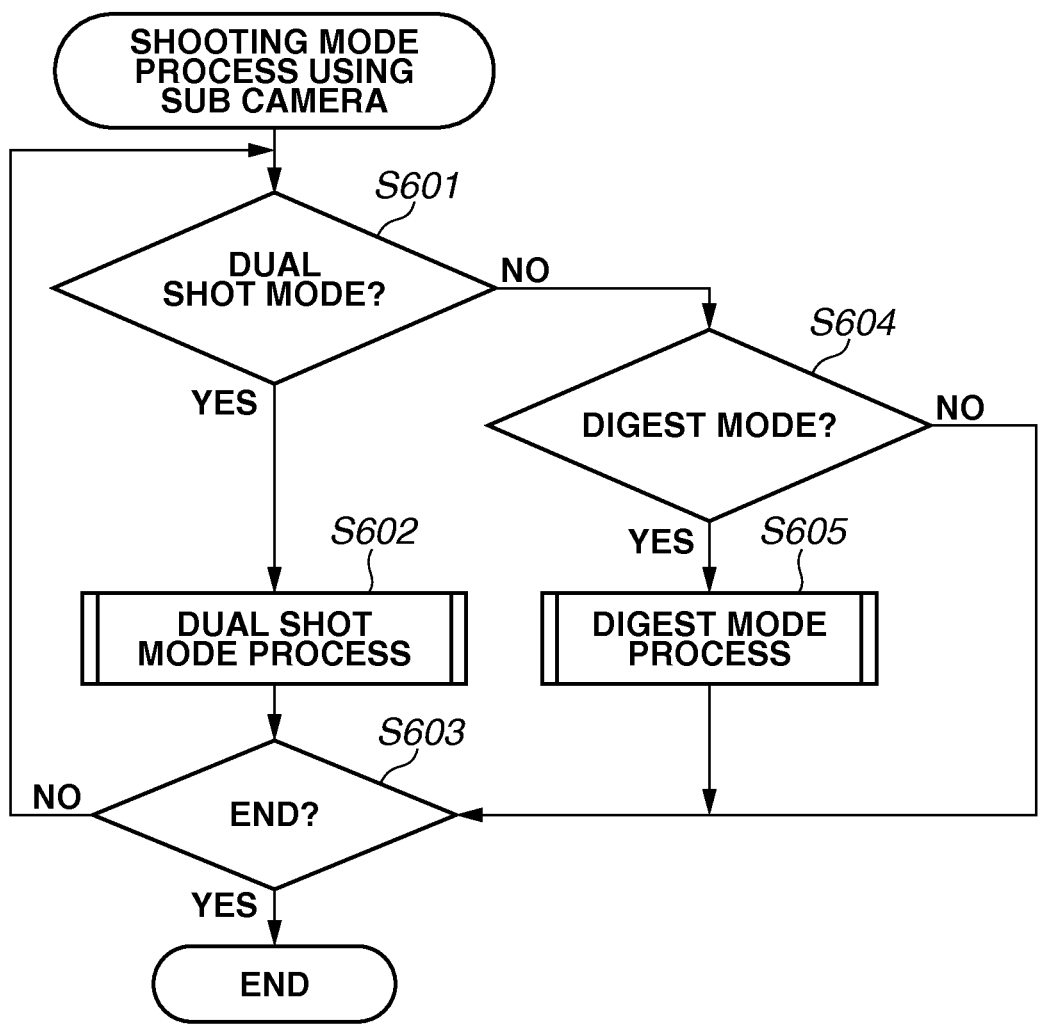
FIG. 6 is a flow chart illustrating a shooting mode process using a sub camera of the digital camera.

Next, with reference to the flow chart illustrated in FIG. 6, the shooting mode process using the sub camera 150 is described.

First, in step S601, determination of whether the currently selected shooting mode is the dual shot mode. If it is determined that the currently selected shooting mode is the dual shot mode (YES in step S601), then in step S602, a dual shot mode capturing process is performed. The dual shot mode capturing process will be described later with reference to the flow chart illustrated in FIG. 7. Then, the processing proceeds to step S603. If it is determined in step S601 that the currently selected mode is not the dual shot mode (NO in step S601), the processing proceeds to step S604. In step S604, determination of whether the currently selected shooting mode is the digest mode is performed. If it is determined that the currently selected shooting mode is the digest mode (YES in step S604), then in step S605, a digest mode capturing process is performed. The digest mode capturing process will be described later with reference to the flow chart illustrated in FIG. 8. Then, the processing proceeds to step S603. In step S603, determination of whether the shooting mode using the sub camera 150 is to be ended is performed. If the shooting mode using the sub camera 150 is to be ended (YES in step S603), the shooting mode process using the sub camera 150 ends. If the shooting mode using the sub camera 150 is not to be ended (NO in step S603), the processing returns to step S601. In step S601, the mode remains in the shooting mode using the sub camera 150.

Next, a live image display position determination process is described.

Figure 4A:
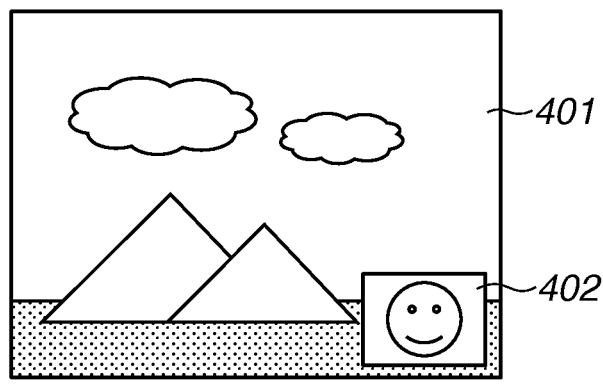
FIGS. 4A and 4B are diagrams each illustrating an example of displaying an image obtained by superimposing a sub image on a main image.
Figure 4B:
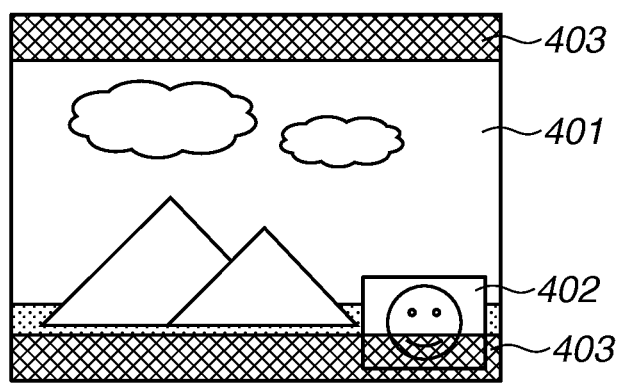

If the capturing setting of the sub camera 150 is on, to display a live image on the display unit 28, the live image is displayed by superimposing a live image (a sub live image) captured by the sub camera 150 on a live image (a main live image) captured by the main camera 104. Normally, as illustrated in FIG. 4A, a sub image 402 is placed aside at the lower right of the main image 401 (in an end portion of the image). The photographer considers that the image displayed on the display unit 28 is to be recorded. Thus, the image is displayed by combining the sub live image at a position equivalent to the position where the sub live image is combined when the image is recorded. In the digest mode, however, the moving image having an aspect ratio different from that of the still image is recorded in the background in a capturing standby state, where the live images are displayed. That is, areas 403 in FIG. 4B are areas not to be recorded as the moving image. This results in recording the moving image with a part of the sub image missing.

Thus, the digital camera 100 according to the present exemplary embodiment determines the display position of the sub image as follows.

Figure 9:
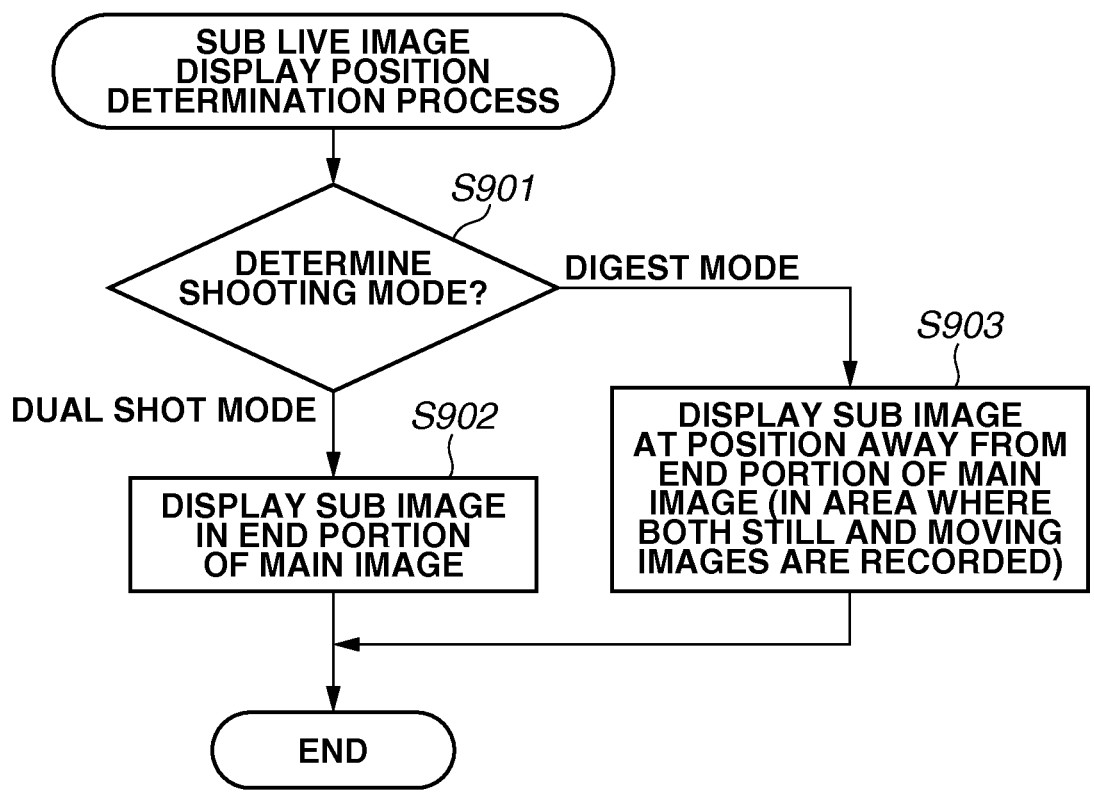
FIG. 9 is a flow chart illustrating a sub live image display position determination process.

FIG. 9 is a flow chart illustrating the sub live image display position determination process when the capturing setting of the sub camera 150 is on.

In step S901, determination of whether the shooting mode is the dual shot mode or the digest mode is performed. If it is determined that the shooting mode is the dual shot mode, the processing proceeds to step S902. If it is determined that the shooting mode is the digest mode, the processing proceeds to step S903.

Figure 10A:
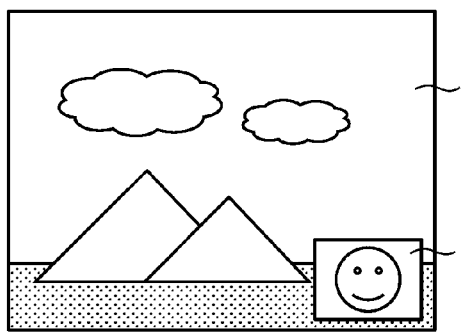
FIGS. 10A, 10B, 10C, 10D, 10E, and 10F are diagrams each illustrating a display position of sub image displayed by superimposing a sub image on a main image.
Figure 10B:
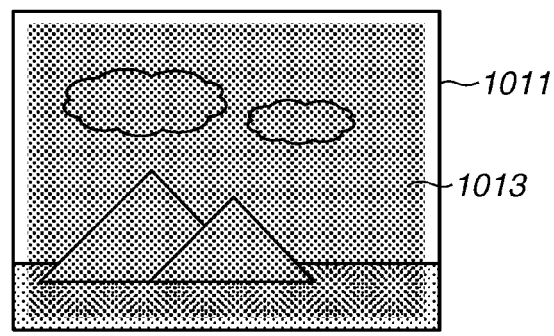

In step S902, the placement position of a sub live image in the dual shot mode is determined. According to the present exemplary embodiment, as illustrated in FIG. 10A, a sub live image 1012 is determined to be displayed in an end portion of a screen (an area where a main live image 1011 is displayed). According to the present exemplary embodiment, the sub live image 1012 is placed in the end portion of the main live image 1011, but is placed at a position a predetermined distance away from the ends of the main live image 1011. The sub live image 1012 may be placed not only at this display position, but also at a position where the sub live image 1012 is in contact with the ends of the main live image 1011. According to the present exemplary embodiment, an area 1013 illustrated in FIG. 10B is set as an area where the sub live image 1012 can be placed. Although the sub live image 1012 can be placed in the area 1013, normally, an object is often located in a center portion of the main image 1011. Thus, the sub live image 1012 is determined to be placed in such a manner that the sub live image 1012 is in contact with the ends of the area 1013 so as not to cover the object. Further, in the dual shot mode, the area 1013, where the sub live image 1012 can be placed, is the entire area obtained by removing from the main image 1011 an area having a predetermined number of pixels from the ends of the main image 1011. According to the present exemplary embodiment, taking into account the design qualities of the layout of when the main image and the sub image are combined, an area obtained by removing a predetermined small number of pixels from the ends of the main image is set as an area where the sub image can be placed. Alternatively, the entire main image 1011 may be set as an area where the sub live image 1012 can be placed. In step S902, the display position of the sub live image is determined, and the processing of this flow chart ends.

Figure 10C:
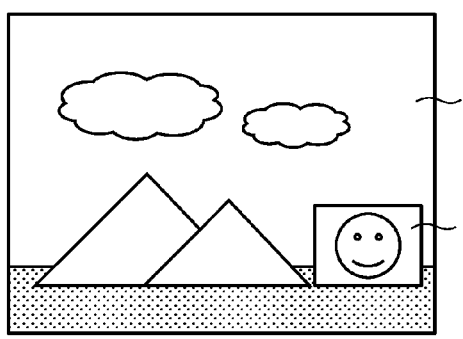
Figure 10D:
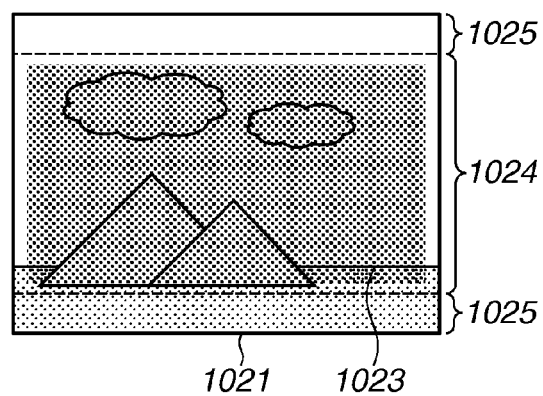

In step S903, the placement position of a sub live image in the digest mode is determined. In the dual shot mode, as illustrated in FIG. 10A, the sub live image is placed in an end portion of the area where the main live image is displayed. In the digest mode, as illustrated in FIG. 10C, a sub live image 1022 is placed at a position away from an end portion of the area where a main live image 1021 is displayed. In the digest mode, the aspect ratio of the still image (4:3) to be recorded is different from the aspect ratio of the moving image (19:9) to be recorded. Therefore, as illustrated in FIG. 10D, in the main image 1021, only an area 1024 is recorded as the moving image, and areas 1025 are not recorded as the moving image. Thus, the sub live image 1022 is displayed by placing the sub live image 1022 in the area 1024 to avoid the areas 1025. That is, the sub live image 1022 is determined to be placed at a position upwardly away from a lower end portion of the main live image 1021 in FIG. 10C by avoiding the area 1025 included in the lower end portion. In the digest mode, an area 1023, where the sub live image 1022 can be placed, is an area included in the area 1024, which does not include the areas 1025. Similarly to the dual shot mode, also in the digest mode, an area obtained by removing a predetermined small number of pixels from the ends of the area 1024 is set as an area where the sub live image 1022 can be placed. Alternatively, the entire area 1024 may be set as an area where the sub live image 1022 can be placed.

The display position (the placement position) of the sub live image to be displayed in each of the dual shot mode and the digest mode is thus determined. Then, in step S503, an image obtained by superimposing the sub live image on the main live image at the determined display position is displayed. The aspect ratio of the still image to be recorded in each of the dual shot mode and the digest mode is 4:3. Thus, the aspect ratio of the main image 1011 to be displayed in the dual shot mode is 4:3, and the aspect ratio of the main image 1021 to be displayed in the digest mode is also 4:3.

As described above, in the dual shot mode, the digital camera 100 according to the present exemplary embodiment displays an image obtained by placing the sub image in an end portion of the main image. In contrast, in the digest mode, the digital camera 100 displays an image obtained by placing the sub image not in an end portion of the main image, but at a position where the moving image is recorded in the digest mode and which is a certain distance away in a predetermined direction from the end portion where the sub image is displayed in the dual shot mode. The sub image 1022 is placed at a position a certain distance away from the ends of the main image 1021 to be displayed. This prevents the sub image 1021 from being cut halfway in the recorded moving image. Further, with the above-described display process, it is possible to confirm the main image to be recorded as the still image, while confirming the content of the sub image to be recorded as the moving image and the position of the sub image of when combined with the main image. Such a display method is effective in a mode of recording a plurality of images having different aspect ratios.

According to the present exemplary embodiment, it is determined that the sub live image is to be placed in the lower right corner of the main live image. Alternatively, the sub live image may be placed in the upper right corner. That is, the sub live image may be placed in any of the four corners of the area where the sub live image can be placed. Yet alternatively, the sub image may be placed not in a corner but in contact with a side of the area where the sub live image can be placed. Further, if the entire main image 1011 is set as an area where the sub live image 1012 can be placed, one of the corners of the main live image 1011 overlaps one of the corners of the sub live image 1012, or the sub live image 1012 is placed in contact with one side of the main live image 1011.

Further, in the above description, the display position of the sub live image is determined so that the sub live image is displayed at the position illustrated in FIG. 10A or 10C. Alternatively, a default display position may be set to the position in FIG. 10A or 10C, and then, according to an operation performed by the user, the display position of the sub live image can be changed in the area 1013 or 1023, where the sub live image can be placed. In this case, the changed display position of the sub live image and the shooting mode are stored in the memory 32. Then, when the sub live image display position determination process is performed next, the display position stored in the memory 32 is read, and the sub live image is displayed at the read display position. If the shooting mode stored in the memory 32 of when the previous sub image has been displayed is different from the currently set shooting mode, the area where the sub live image can be placed differs. Thus, the display position of the sub live image is adjusted. The display position is adjusted by changing the display position so that the sub live image is displayed in, among end portion areas in the four corners of the area where the sub live image can be placed, the end portion area closest to the display position read from the memory 32. If the dual shot mode has been changed to the digest mode, the display position of the sub live image moves in a direction away from an end portion of the main image. If, on the other hand, the digest mode has been changed to the dual shot mode, the display position of the sub live image moves in a direction toward an end portion of the main image.

According to the present exemplary embodiment, in the digest mode, the aspect ratio of the still image is fixed to 4:3. In recent years, however, a still image is also increasingly captured for viewing on a television or a display, similarly to a moving image. Thus, an aspect ratio of 16:9 may be allowed to be selected as the recording size.

Figure 7:
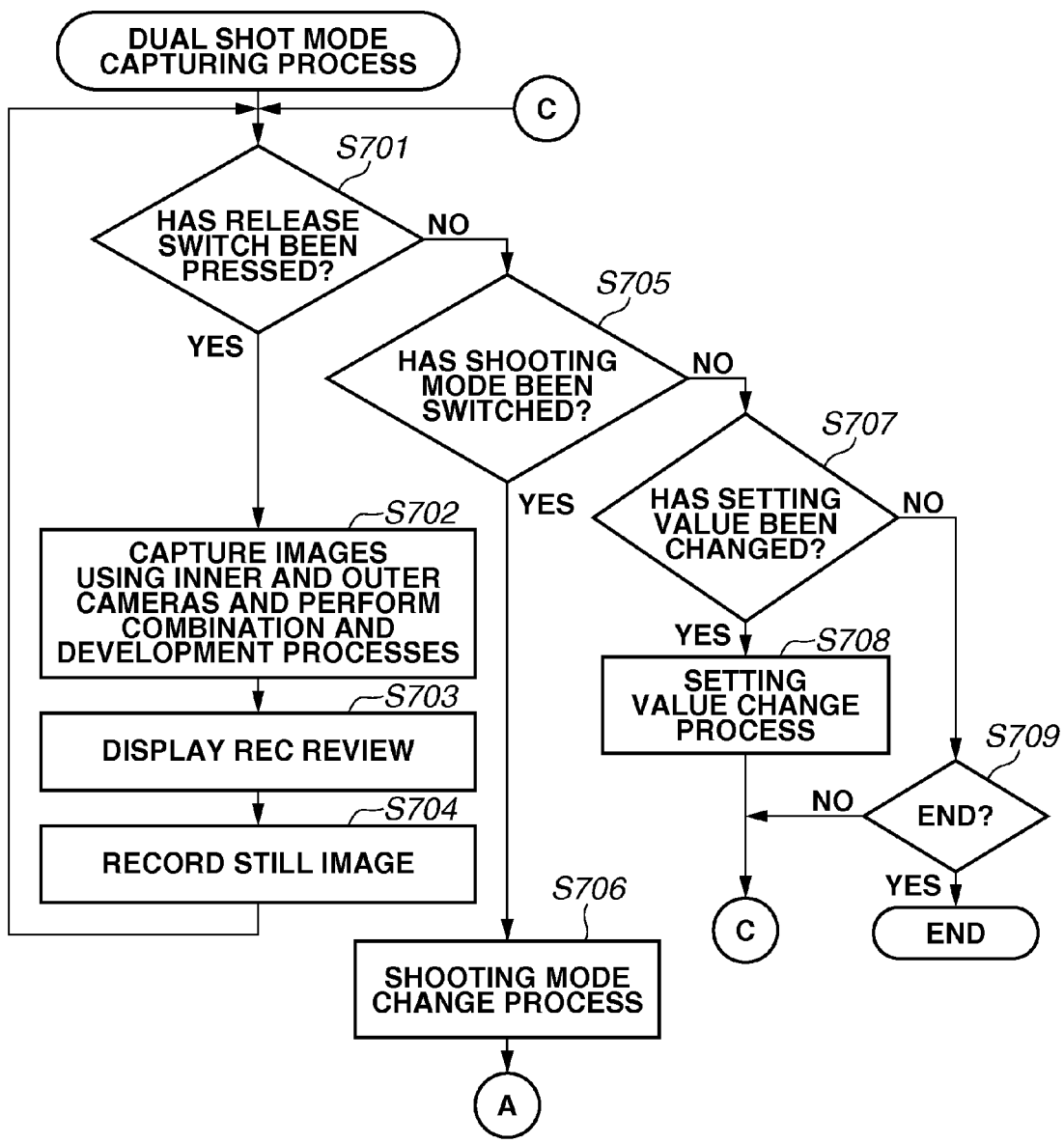
FIG. 7 is a flow chart illustrating a process in a digest mode of the digital camera.

Next, with reference to the flow chart illustrated in FIG. 7, the dual shot mode capturing process is described.

In step S701, determination of whether a release switch, i.e., the shutter button 64, has been fully pressed and the second shutter switch signal SW2 has been input is performed. If it is determined that the release switch has been pressed (YES in step S701), the processing proceeds to step S702. If the release switch has not been pressed (NO in step S701), the processing proceeds to step S705. A description of the process performed when the shutter button 64 has been half pressed and the first shutter switch signal SW1 has been input is not given here. In such a case, the capturing preparation process is performed as described above. If the release switch has been pressed, then in step S702, the inner camera 150 and the outer camera 104 capture images, and a composition process and a development process is performed on the captured images. That is, the images captured by the inner camera 150 and the outer camera 104 are obtained and a raw image format (RAW) image is created using an image obtained by, as illustrated in FIG. 12D, combining the sub image captured by the sub camera 150 with the main image captured by the main camera 104 in a superimposed manner. Then, a development process is performed on the RAW image to generate a composite image (a still image). According to the present exemplary embodiment, the still image to be recorded in the dual shot mode has an aspect ratio of 4:3 as described above. Further, the sub image is combined with the main image in such a manner that the composition position has the same positional relationship as that between the main live image and the sub live image (FIG. 10A) displayed on the display unit 28. That is, the composition position is determined using information about the display position determined in the sub live image display position determination process in step S502. In step S703, a review after the capturing is displayed. In the dual shot mode, a still image is recorded that is equivalent to the live image of when the shutter button 64 has been fully pressed during a capturing standby state. Thus, the review to be displayed on the display unit 28 is displayed as illustrated in FIG. 10A. The user confirms this review display immediately after the capturing, and thereby can understand what still image has actually been captured. In step S704, the system control unit 50 performs a recording process for saving the still image generated in step S702 (the composite image obtained by combining the sub image with the main image) as a single still image file in the recording medium 200. The processes of steps S701 to S704 are thus performed, whereby it is possible to generate and record a composite image obtained by combining the sub image with the main image in the dual shot mode. If the composite image recording process ends, the processing returns to step S701. Then, the state is returned to the capturing standby state.

In step S705, determination of whether the shooting mode setting has been changed by an operation on the mode switching switch 60 and switched to a mode other than the dual shot mode is performed. If the shooting mode setting has been switched (YES in step S705), then in step S706, a shooting mode change process is performed. Then, the processing proceeds to step S501 illustrated in FIG. 5 and returns to an initial process in a shooting mode. If the shooting mode setting has not been switched (NO in step S705), the mode remains in the dual shot mode, and the processing proceeds to step S707. In step S707, determination of whether a capturing setting value has been changed is performed. The term "capturing setting value" refers to a setting, such as an exposure value, photometry, the International Organization for Standardization (ISO) sensitivity, or the on/off state of a self-timer. If a setting value has been changed (YES in step S707), the processing proceeds to step S708. In step S708, a setting value change process is performed, and the processing proceeds to step S701 and the state is returned to the capturing standby state in the dual shot mode. If a setting value has not been changed (NO in step S707), the processing proceeds to step S709. In step S709, determination of whether the dual shot mode is to be ended is performed. If the dual shot mode is to be ended (YES in step S709), the dual shot mode is ended. If the dual shot mode is not to be ended (NO in step S709), the processing returns to step S701 and the state is returned to the capturing standby state in the dual shot mode.

Figure 8:
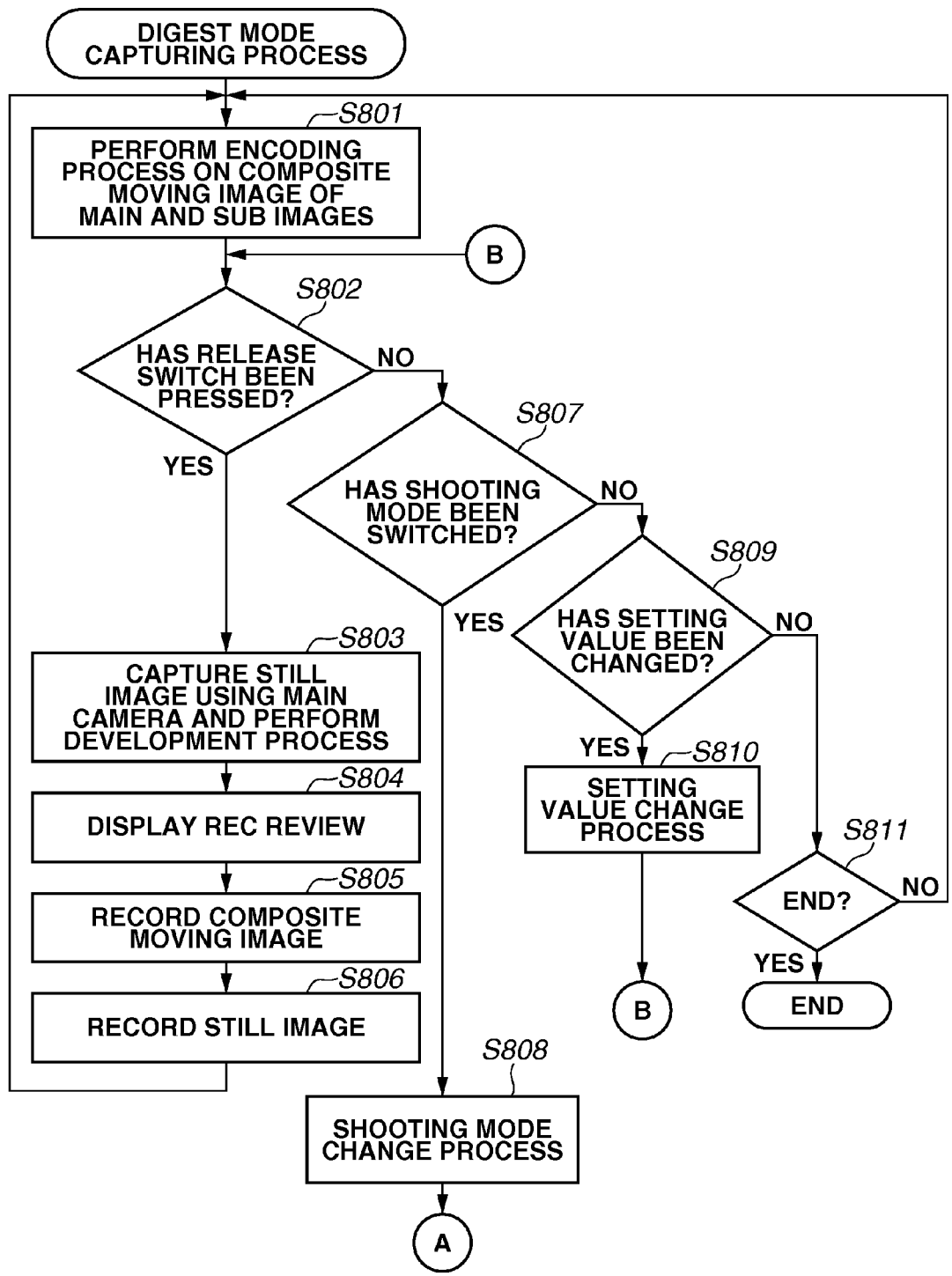
FIG. 8 is a flow chart illustrating a process in a dual shot mode of the digital camera.

Next, with reference to the flow chart illustrated in FIG. 8, the digest mode capturing process is described.

In step S801, in the capturing standby state, an encoding process is performed on a composite moving image obtained by combining the sub image with the main image. In the digest mode, if the state of the sub camera 150 is on as determined in step S501, a moving image captured for 4 seconds before the shutter button 64 has been pressed in the capturing standby state is recorded together with the still image. The moving image to be recorded in the digest mode is a composite moving image obtained by combining the sub image with the main image. The sub image is combined with the main image in such a manner that the composition position has the same positional relationship as that between the main live image and the sub live image (FIG. 10C) displayed on the display unit 28. That is, the composition position is determined using information about the display position determined in the sub live image display position determination process in step S502. However, the aspect ratio of the main image 1021 illustrated in FIG. 10C is 4:3, whereas the aspect ratio of the moving image to be recorded is 16:9. Thus, an image of a partial area of the main image 1021 (an area corresponding to the area 1024 illustrated in FIG. 10D) is extracted and the sub image 1022 is combined with the extracted image, thereby generating a composite moving image. The generated composite moving image is encoded and a maximum of 4 seconds of the composite moving image is held in a ring buffer format in the memory 32.

In step S802, determination of whether a release switch, i.e., the shutter button 64, has been fully pressed is performed. If it is determined that the release switch has been pressed (YES in step S802), the processing proceeds to step S803. If the release switch has not been pressed (NO in step S802), the processing proceeds to step S807.

If the release switch has been pressed, then in step S803, the main camera 104 (the image capture unit 22) captures a still image, and a development process is performed on the captured still image. The sub image captured by the inner camera 150 is not combined with the still image to be recorded in the digest mode. Thus, the development process is only performed on the main image captured by the outer camera 104. As has been described above, the aspect ratio of the still image to be recorded in the digest mode is fixed to 4:3. Then, in step S804, a REC review display process is performed for displaying on the display unit 28 the still image generated by performing the development process in step S803. In step S805, the process is performed for recording in the recording medium 200 the composite moving image of the main image and the sub image encoded and stored in the memory 32 in step S801. Then, the processing proceeds to step S806. In step S806, a recording process is performed for recording the still image developed in step S803, as a single still image file in the recording medium 200. When recording the composite moving image in the recording medium 200 in step S805, the composite moving image is recorded by adding the composite moving image to a moving image file for a moving image captured in the digest mode. That is, in the digest mode, each still image is recorded as a single still image file, whereas a moving image is recorded in such a manner that moving images obtained by being captured multiple times are recorded as a single moving image file.

The processes of steps S801 to S806 are thus performed, whereby it is possible to record a composite moving image as illustrated in FIG. 12A and a single still image as illustrated in FIG. 12B in the digest mode. A description is not given of a case where the capturing setting of the sub camera 150 is off. In such a case, in step S801, a composite moving image is not stored but a moving image of the main image captured by the outer camera 104 is stored in the memory 32. Then, in step S805, the moving image of the main image is recorded.

When the process of step S806 has ended, the processing returns to step S801 and the state is returned to the capturing standby state.

In step S807, determination of whether the shooting mode setting has been changed by an operation on the mode switching switch 60 and switched to a mode other than the digest mode is performed. If the shooting mode setting has been switched (YES in step S807), then in step S808, a shooting mode change process is performed. Then, the processing proceeds to step S501 illustrated in FIG. 5 and returns to an initial process in a shooting mode. If the shooting mode setting has not been switched (NO in step S807), the mode remains in the digest mode, and the processing proceeds to step S809.

In step S809, determination of whether a capturing setting value has been changed is performed. This process is similar to the process of step S707. However, capturing setting values that can be changed are different depending on the mode. For example, in the digest mode, a moving image is encoded in step S801 as described above. Thus, it is convenient if an exposure value and a photometric value are fixed. Thus, it is not allowed to change the settings of the exposure value and the photometric value in step S809. If a setting value has been changed (YES in step S809), the processing proceeds to step S810. In step S810, a setting value change process is performed, and the processing proceeds to step S801 and the state is returned to the capturing standby state in the digest mode. If a setting value has not been changed (NO in step S809), the processing proceeds to step S811.

In step S811, determination of whether the digest mode is to be ended is performed. If the digest mode is to be ended (YES in step S811), the digest mode process ends. If the digest mode is not to be ended (NO in step S811), the processing returns to step S801 and the state is returned to the capturing standby state in the digest mode.

The basic configuration and processing of a second exemplary embodiment are similar to those of the first exemplary embodiment and therefore are not described here. The second exemplary embodiment is different from the first exemplary embodiment in the sub live image display position determination process. Thus, with reference to a flow chart illustrated in FIG. 11, the sub live image display position determination process is described. The processing of the flow chart is achieved by the system control unit 50 performing a calculation process and controlling the components of the digital camera 100 based on the program read from the non-volatile memory 56.

FIG. 11 is a flow chart illustrating the sub live image display position determination process when the capturing setting of the sub camera 150 is on.

First, in step S1101, determination of whether the shooting mode is the dual shot mode or the digest mode is performed. If it is determined that the shooting mode is the dual shot mode, the processing proceeds to step S1102. If it is determined that the shooting mode is the digest mode, the processing proceeds to step S1105.

In step S1102, determination of whether a setting for creating a special effect, particularly a setting for creating a special effect on end portions of the image, has been made is performed. According to the present exemplary embodiment, in the dual shot mode, it is possible to make a setting for creating a special effect on end portions of an image, and capturing and recording the image. The setting for creating a special effect on end portions of the image is a setting for creating an effect (performing image processing) by reducing the amount of light in the four corners of the image in a toy camera manner. If it is determined that the special effect mode is set (YES in step S1102), the processing proceeds to step S1104. If it is determined that the special effect mode is not set (NO in step S1102), the processing proceeds to step S1103.

In step S1103, the display position of a sub live image in the dual shot mode where a special effect is not created, is determined in such a manner that the sub image is to be displayed in an end portion of the main image. This is a process similar to that of step S902 and therefore is not described in detail here.

In step S1105, the display position of a sub live image in the digest mode is determined in such a manner that the sub image is to be displayed in an area which is away from an end portion of the main image and where both the still image and the moving image are recorded. This is a process similar to that of step S903 and therefore is not described in detail here.

Figure 10E:
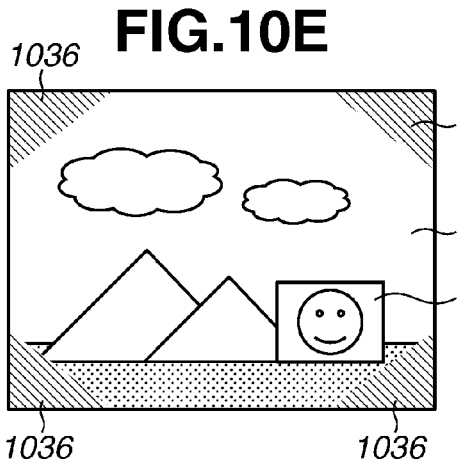
Figure 10F:
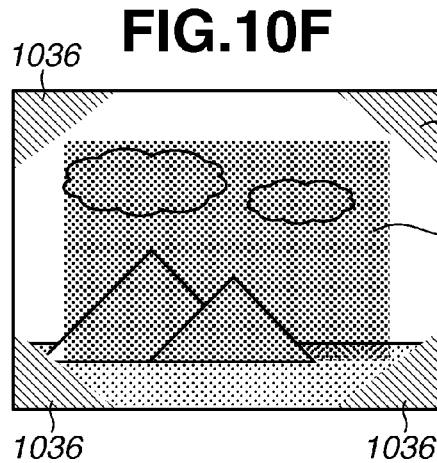

In step S1104, the placement position of a sub live image in the mode of creating a special effect is determined to be on end portions of the image. According to the present exemplary embodiment, as illustrated in FIG. 10E, a special effect is created on areas 1036 in the four corners of a main image 1031. In the normal dual shot mode, the sub image is placed in any one of the four corners of the main image. This prevents the user from confirming the special effect created on the corner. Thus, according to the present exemplary embodiment, if the setting for creating a special effect has been made, not the end portions of the image but an area 1033 illustrated in FIG. 10F, which does not include the areas 1036, on which the special effect is created, is set as an area where the sub image can be placed. Then, the sub image is displayed in this area. An area avoiding the areas 1036, on which the special effect is created, is set as an area where the sub image can be placed. Thus, if the setting for creating a special effect has been made, the sub image is displayed at a position away from the end portions of the image and avoiding the areas 1036. The sub image is placed at a location a certain distance away from the ends of the main image, whereby it is possible to avoid the situation where an image captured by the sub camera 150 is placed in a portion on which an effect is created and which is entertaining, thereby preventing the user from confirming the effect. Consequently, it is possible to confirm the effect created on the end portions of the main image and also confirm the sub image on the display unit 28.

The above exemplary embodiments have been described using as an imaging apparatus as example. Alternatively, exemplary embodiments can be implemented in a camera-equipped mobile phone or a handheld game apparatus. The functions of the above exemplary embodiments can be achieved using a plurality of apparatuses, for example, using a system where an imaging apparatus including a plurality of image capture units, a display apparatus including a display unit, and a control apparatus including a control unit are connected together. Parts of the above exemplary embodiments may be appropriately combined together.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-267154 filed Dec. 25, 2013, which is hereby incorporated by reference herein in its entirety.

What is claimed is:

1. An imaging apparatus comprising:
at least one processor;
a first imaging unit;
a second imaging unit;
a control unit configured to perform control to display on a display unit an image obtained by combining an image captured by the second imaging unit with an image captured by the first imaging unit in such a manner that the image captured by the second imaging unit is superimposed on the image captured by the first imaging unit; and
a mode setting unit configured to set a shooting mode from a plurality of imaging modes including a first shooting mode and a second shooting mode,
wherein the control unit performs control so that a composition position at which the image captured by the second imaging unit is combined with the image captured by the first imaging unit in the first shooting mode is different from the composition position in the second shooting mode,
wherein a plurality of images having different aspect ratios is recorded from the image captured by the first imaging unit in response to an imaging instruction in the first shooting mode, and
wherein at least one of the control unit and mode setting unit is implemented by the at least one processor.

2. The imaging apparatus according to claim 1, wherein the control unit performs control in such a manner that the image captured by the first imaging unit is displayed at a same aspect ratio both when a first shooting mode has been set and when a second shooting mode has been set, and performs control in such a manner that the composition position of the image captured by the second imaging unit to the image captured by the first imaging unit differs between when the first shooting mode has been set and when the second shooting mode has been set.

3. The imaging apparatus according to claim 1, wherein the control unit performs control to display an image obtained by superimposing a live image captured by the second imaging unit on a live image captured by the first imaging unit.

4. The imaging apparatus according to claim 1, further comprising a setting unit implemented by the at least one processor and configured to set whether the image captured by the second imaging unit is to be combined with the image captured by the first imaging unit in such a manner that the image captured by the second imaging unit is superimposed on the image captured by the first imaging unit.

5. The imaging apparatus according to claim 1, wherein the control unit performs control in such a manner that when a first shooting mode has been set by the mode setting unit, the image captured by the second imaging unit is displayed at a position further away from a corner portion or an end portion of the image captured by the first imaging unit than a position of when a second shooting mode has been set by the mode setting unit.

6. The imaging apparatus according to claim 5, wherein each of the first shooting mode and the second shooting mode is a shooting mode for capturing a still image.

7. The imaging apparatus according to claim 5, wherein the image which is captured by the first imaging unit and is to be displayed in the first shooting mode and the image which is captured by the first imaging unit and is to be displayed in the second shooting mode are images having a same aspect ratio.

8. The imaging apparatus according to claim 5,
wherein the first shooting mode is a still image capturing mode for creating a special effect on an end portion of the image captured by the first imaging unit, and
wherein the control unit performs control in such a manner that when the first shooting mode has been set, the image captured by the second imaging unit is displayed in the image captured by the first imaging unit in an area avoiding an area on which the special effect is created.

9. The imaging apparatus according to claim 5, wherein the control unit performs control in such a manner that when the second shooting mode has been set, the image captured by the second imaging unit is displayed in an end portion of the image captured by the first imaging unit.

10. The imaging apparatus according to claim 9, wherein the control unit performs control in such a manner that when the second shooting mode has been set, the image captured by the second imaging unit is displayed at a position where the image captured by the second imaging unit is in contact with one side of the image captured by the first imaging unit.

11. The imaging apparatus according to claim 9, wherein the control unit performs control in such a manner that when the second shooting mode has been set, the image captured by the second imaging unit is displayed in the image captured by the first imaging unit and is to be displayed on the display unit at an end of an area where the image captured by the second imaging unit can be placed.

12. The imaging apparatus according to claim 9, wherein the control unit performs control in such a manner that when the second shooting mode has been set, the image captured by the second imaging unit is displayed at a position a predetermined distance away from an end of the image captured by the first imaging unit, and when the first shooting mode has been set, the image captured by the second imaging unit is displayed at a position further than the predetermined distance away from the end of the image captured by the first imaging unit.

13. The imaging apparatus according to claim 5, wherein the first shooting mode is a shooting mode for recording a still image captured by the first imaging unit and for recording an image captured by the first imaging unit having an aspect ratio different from an aspect ratio of the still image.

14. The imaging apparatus according to claim 13, wherein the first shooting mode is a still image capturing mode for recording an image captured by the first imaging unit and for recording an image captured by the first imaging unit as a moving image having an aspect ratio different from an aspect ratio of the still image.

15. The imaging apparatus according to claim 13, wherein the control unit performs control in such a manner that when the first shooting mode has been set, the image captured by the second imaging unit is displayed in the image which is captured by the first imaging unit and is to be displayed on the display unit at a position avoiding an area not to be recorded as the image to be recorded together with the still image.

16. The imaging apparatus according to claim 13, wherein the control unit performs control in such a manner that when the first shooting mode is set, the image captured by the second imaging unit is displayed in an area of the image captured by the first imaging unit to be recorded both as the still image and the image having the aspect ratio different from the aspect ratio of the still image.

17. The imaging apparatus according to claim 13, further comprising a recording unit implemented by the at least one processor and configured to, when the first shooting mode is set, record in a recording medium an image obtained by superimposing the image captured by the second imaging unit on the image captured by the first imaging unit having the aspect ratio different from the aspect ratio of the still image.

18. A method of controlling an imaging apparatus including a first imaging unit and a second imaging unit, the method comprising:
performing control to display an image obtained by combining an image captured by the second imaging unit with an image captured by the first imaging unit in such a manner that the image captured by the second imaging unit is superimposed on the image captured by the first imaging unit; and
setting a shooting mode from a plurality of imaging modes including a first shooting mode and a second shooting mode,
wherein performing control includes performing control so that a composition position at which the image captured by the second imaging unit is combined with the image captured by the first imaging unit in the first shooting mode is different from the composition position in the second shooting mode, and
wherein a plurality of images having different aspect ratios is recorded from the image captured by the first imaging unit in response to an imaging instruction in the first shooting mode.

19. A non-transitory computer-readable storage medium storing computer executable instructions to cause a computer to perform a method of controlling an imaging apparatus including a first imaging unit and a second imaging unit, the method comprising:
performing control to display an image obtained by combining an image captured by the second imaging unit with an image captured by the first imaging unit in such a manner that the image captured by the second imaging unit is superimposed on the image captured by the first imaging unit; and
setting a shooting mode from a plurality of imaging modes including a first shooting mode and a second shooting mode,
wherein performing control includes performing control so that a composition position at which the image captured by the second imaging unit is combined with the image captured by the first imaging unit in the first shooting mode is different from the composition position in the second shooting mode, and
wherein a plurality of images having different aspect ratios is recorded from the image captured by the first imaging unit in response to an imaging instruction in the first shooting mode.

* * * * *